US008527144B2

(12) United States Patent
Oda et al.

(10) Patent No.: US 8,527,144 B2
(45) Date of Patent: Sep. 3, 2013

(54) IN-VEHICLE APPARATUS AND METHOD FOR CONTROLLING SAME

(75) Inventors: Kyoji Oda, Gamagori (JP); Kenji Miyake, Anjo (JP); Hideo Miyauchi, Obu (JP)

(73) Assignee: DENSO CORPORATION, Kariya (JP)

( * ) Notice: Subject to any disclaimer, the term of this patent is extended or adjusted under 35 U.S.C. 154(b) by 267 days.

(21) Appl. No.: 12/923,202

(22) Filed: Sep. 9, 2010

(65) Prior Publication Data

US 2011/0106367 A1 May 5, 2011

(30) Foreign Application Priority Data

Oct. 30, 2009 (JP) ................................ 2009-250433

(51) Int. Cl.
*G06F 7/00* (2006.01)

(52) U.S. Cl.
USPC .............................. 701/36; 715/765; 715/778

(58) Field of Classification Search
USPC .................. 701/487, 36, 538; 715/708, 763, 715/765, 778, 779
See application file for complete search history.

(56) References Cited

U.S. PATENT DOCUMENTS

| | | | | |
|---|---|---|---|---|
| 7,676,754 | B2 * | 3/2010 | Basson et al. | 715/762 |
| 2004/0117084 | A1 * | 6/2004 | Mercier et al. | 701/36 |
| 2007/0101297 | A1 * | 5/2007 | Forstall et al. | 715/841 |
| 2008/0033633 | A1 * | 2/2008 | Akiyoshi et al. | 701/201 |

FOREIGN PATENT DOCUMENTS

| | | |
|---|---|---|
| JP | A-10-148534 | 6/1998 |
| JP | A-2004-61252 | 2/2004 |
| JP | A-2006-21692 | 1/2006 |
| JP | A-2007-45169 | 2/2007 |
| JP | A-2007-316932 | 12/2007 |
| JP | A-2007-317121 | 12/2007 |
| JP | 2008-40596 | 2/2008 |
| JP | A-2009-26239 | 2/2009 |

OTHER PUBLICATIONS

Machine translation of JP 2007-045169.*
Machine translation of JP 10-148534.*
Office Action mailed Feb. 21, 2012 in corresponding JP application No. 2009-250433 (and English translation).
Office Action mailed Aug. 17, 2011 in corresponding JP application No. 2009250433 (and English translation).

* cited by examiner

*Primary Examiner* — Thomas Tarcza
*Assistant Examiner* — Kevin Myhre
(74) *Attorney, Agent, or Firm* — Posz Law Group, PLC

(57) ABSTRACT

An in-vehicle apparatus changes icon appearance of gadget-associated icons according to travel impediment information associated with respective gadgets during the travel of a vehicle. The icon appearance has an improved recognizability if the icon is associated with a gadget that does not impede the travel of the vehicle, or has a worsened recognizability if the icon is associated with a gadget that impedes the travel of the vehicle. As a result, the in-vehicle apparatus allows a user to easily recognize whether a gadget-associated icon has impeding operation steps or non-impeding operation steps for the execution of the respective gadgets, thereby enabling a safer travel of the vehicle.

19 Claims, 5 Drawing Sheets

| GADGET | IMPED LEVEL |
|---|---|
| GADGET A | IMPED LEVEL 1 |
| GADGET B | IMPED LEVEL 1 |
| GADGET C | IMPED LEVEL 2 |
| GADGET D | IMPED LEVEL 1 |
| GADGET E | IMPED LEVEL 2 |
| GADGET F | IMPED LEVEL 1 |

FIG. 5

| GADGET | IMPED LEVEL |
|---|---|
| GADGET A | IMPED LEVEL 1 |
| GADGET B | IMPED LEVEL 1 |
| GADGET C | IMPED LEVEL 2 |
| GADGET D | IMPED LEVEL 1 |
| GADGET E | IMPED LEVEL 2 |
| GADGET F | IMPED LEVEL 1 |
| GADGET G | IMPED LEVEL 2 |
| GADGET H | IMPED LEVEL 1 |
| GADGET I | IMPED LEVEL 1 |
| GADGET J | IMPED LEVEL 2 |
| GADGET K | IMPED LEVEL 1 |
| GADGET L | IMPED LEVEL 1 |

IN-VEHICLE APPARATUS AND METHOD FOR CONTROLLING SAME

CROSS REFERENCE TO RELATED APPLICATION

The present application is based on and claims the benefit of priority of Japanese Patent Application No. 2009-250433, filed on Oct. 30, 2009, the disclosure of which is incorporated herein by reference.

FIELD OF THE INVENTION

The present invention generally relates to an in-vehicle apparatus that stores a gadget having travel impediment information associated therewith and displays a gadget-associated icon on a display screen.

BACKGROUND INFORMATION

A Japanese patent document 1 cited below discloses a gadget and a gadget-associated icon displayed on a screen of an information processing apparatus such a personal computer or the like. In this case, the icon on the screen, which is a small-sized graphic representation depicting a gadget functionality, is operated (i.e., "touched") by a user, for performing the function corresponding to the gadget, or for calling a software program corresponding to the gadget. For example, when an icon corresponding to a stop-watch gadget is displayed on the screen, the icon is operated to execute a stop-watch function. The gadget, which is itself a small program, provides an easy access for the user to a frequently-used tool. The gadget is also known as a "widget."

Patent document 1: JP-A-2009-26239

In recent years, thanks to the progress of Graphical User Interface (GUI) technology for in-vehicle apparatus, the gadget is used in the in-vehicle apparatus with its associated icon. In that case, the user may be obliged to recognize the icon while the vehicle is stopping, or may also be obliged to recognize the icon while the vehicle is traveling. Therefore, the recognizability of the icon, especially while the vehicle is traveling, should carefully be examined for the improvement of the vehicle safety.

While some gadget can be executed by a simple operation of the user, other gadget demands a complex operation for the execution, such as a series of predetermined operations or the like. The operation of the icon may thus lead to the following problems, depending on the nature of the icon. That is, the configuration of the gadget associated with the icon may vary one by one. The "complex" gadget demanding the complex operation may impede other driving operations if the user inadvertently operated the icon associated with that complex gadget during the travel of the vehicle, while the gadget may not impede the driving operations at the vehicle stopping time. In other words, the user's need for easy icon recognition is high, in terms of allowing the user to easily recognize and determine whether a specific icon is associated with a "simple" gadget or a "complex" gadget.

SUMMARY OF THE INVENTION

In view of the above and other problems, the present invention provides an in-vehicle apparatus that allows easy icon recognition for a user in a vehicle, in terms of determining whether or not an operation of an icon by the user during a travel of the vehicle causes an impediment for the travel of the vehicle.

In an aspect of the present disclosure, an in-vehicle apparatus includes: a memory unit for memorizing a gadget that is associated with information on a travel impediment of a vehicle; a display unit for displaying a gadget-associated icon that is associated with the gadget in the memory unit; an operation reception unit for receiving an operation of the icon that is being displayed on a screen of the display unit; a control unit for controlling execution of a gadget-associated process that is associated with the gadget when the control unit determines that the displayed gadget-associated icon on the screen of the display unit has received the operation through the operation reception unit; and a travel condition acquisition unit for acquiring a travel condition of the vehicle which has the in-vehicle apparatus disposed thereon. The control unit of the in-vehicle apparatus changes icon appearance according to (a) the information on the travel impediment associated with the gadget, and (b) the travel condition of the vehicle acquired by the travel condition acquisition unit.

By employing the above-described control scheme, the gadget-associated icon displayed on the screen is changed to have an easily-recognizable appearance if the travel impediment information associated with the gadget indicates that an operation procedure of the gadget-associated icon is easy and simple or the like, or is changed to have a hardly-recognizable appearance if the travel impediment information associated with the gadget indicates that an operation procedure of the gadget-associated icon is difficult and complex or the like. In this manner, the user in the vehicle can easily recognize that an icon on the screen of the display unit is easy to operate or hard to operate during the travel of the vehicle, in terms of impediment to, for example, the driving operation of the vehicle. In other words, the recognizability of the gadget-associated icon during the travel of the vehicle is improved.

In another aspect of the present disclosure, a method of controlling an in-vehicle apparatus in a vehicle includes: memorizing a gadget that is associated with information on a travel impediment of the vehicle; displaying on a screen a gadget-associated icon that is associated with the memorized gadget; receiving an operation of the icon that is being displayed on the screen; controlling execution of a gadget-associated process that is associated with the gadget when it is determined that the displayed gadget-associated icon on the screen has received the operation; and acquiring a travel condition of the vehicle that has the in-vehicle apparatus disposed thereon. Based on the above process, icon appearance is changed according to (a) the information on the travel impediment associated with the gadget, and (b) the acquired travel condition of the vehicle.

The above-described method of controlling the in-vehicle apparatus improves the recognizability of the gadget-associated icon during the travel of the vehicle for the same reason as the control scheme of the above-described in-vehicle apparatus.

In yet another aspect of the present disclosure, a method of controlling an in-vehicle apparatus in a vehicle, having functional gadgets respectively represented by an icon displayed on a screen, includes: determining that an icon display condition is in a normal condition; determining whether vehicle speed is over a first threshold; morphing icon appearance by a preset rule according to travel impediment information of the respective gadgets when the vehicle speed is over the first threshold; restoring original icon appearance when the vehicle speed falls down below a second threshold that is smaller than the first threshold; and returning to the determination of the icon display condition. The method classifies the gadgets into at least two impediment levels according to the travel impediment information associated therewith.

The above-described method of controlling the in-vehicle apparatus improves the recognizability of the gadget-associated icon during the travel of the vehicle for the same reason as the control scheme of the above-described in-vehicle apparatus.

BRIEF DESCRIPTION OF THE DRAWINGS

Objects, features, and advantages of the present disclosure will become more apparent from the following detailed description made with reference to the accompanying drawings, in which:

FIG. 5 is a table diagram of a relationship between a gadget type and a regulation revel in a modified embodiment.

DETAILED DESCRIPTION

Figure 1:
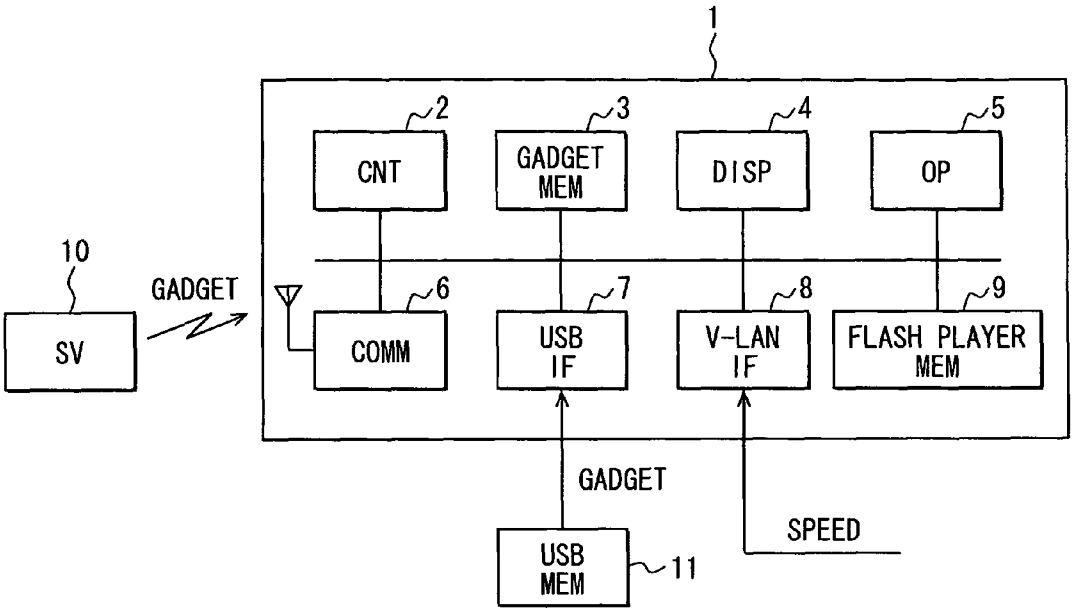
FIG. 1 is a block diagram of an in-vehicle apparatus in an embodiment of the present invention.

The present invention is explained with reference to the drawing.

FIG. 1 is a block diagram of an in-vehicle apparatus in an embodiment of the present invention.

An in-vehicle apparatus 1 is disposed in a vehicle, including a control unit 2 (a control unit in claims), a gadget memory 3 (a memory unit in claims), a display unit 4 (a display unit in claims), an operation reception unit 5 (an operation reception unit in claims), a communication unit 6, a USB interface (IF) unit 7, an in-vehicle LAN interface (IF) unit 8 (a travel condition acquisition unit in claims), and a flash player memory unit 9. Those components described above are inter-connected with each other in the vehicle.

The control unit 2 includes a CPU, a RAM, a ROM, and the like, for controlling an operation of the in-vehicle apparatus 1 such as a data management operation, communication operation and the like, by the execution of a control program. The gadget memory 3 stores, for example, downloaded gadgets received by the communication unit from a server through a broadband wireless communication channel (i.e., a mobile communication channel, a fixed communication channel or the like), and transferred gadgets from a removable USB memory 11 that is attached to the in-vehicle apparatus 1 to the USB IF unit 7.

The display unit 4 includes, for example, a liquid crystal display device, and displays an image on a screen based on an input of image display signal from the control unit 2. The operation reception unit 5 includes, for example, touch switches formed on the screen of the display unit 4, and outputs an operation detection signal indicative of an operation content to the control unit 2 when the user operates (i.e., touches) the touch switches.

The in-vehicle LAN interface unit 8 is connected to various ECUs and sensors in the vehicle through the in-vehicle LAN, and inputs a vehicle speed signal according to a vehicle speed pulse that is output from a vehicle speed sensor in the present embodiment. The flash player memory unit 9 memorizes a flash player that is a program to display a 'swf' file created by Flash (a registered trademark) of Adobe systems.

When the control unit 2 is in a condition of displaying, on a screen of the display unit 4, a gadget-associated icon that is associated with a gadget memorized in the gadget memory 3 by executing the flash player memorized in the flash player memory unit 9, the icon displayed on the screen serves as a touch switch, and the operation (i.e., the touch) of the displayed icon leads to a call for a function or to an execution of a program associated with the gadget. That is, the control unit 2 controls the gadget memory 3 to memorize a stop-watch gadget, for example, and, if a stop-watch icon that looks like a stop-watch displayed on the screen is operated, the function of the stop-watch gadget is performed. In this case, if a gadget-associated icon in a normal condition, which allows the customization of the icon by the user, is detected to be under a customization operation of the user, the gadget-associated icon is customized according to the customization operation of the icon performed by the user. The customization of the icon means the change of appearance of the icon such as a display position, a display size, and a display color of the icon according to an intention of the user.

The gadgets used in the in-vehicle apparatus are classified into two classes, in terms of consideration for user (driver) safety during his/her driving a vehicle. That is, the gadgets belong either to a travel impediment-free class or a travel impediment class. Each of the gadgets is associated with information on travel impediment (i.e., travel compulsion). The gadget belonging to the travel impediment-free class is considered as a gadget that is less likely to impede the driving of the vehicle due to the simplicity of its execution operation or the like. In other words, the gadget in the travel impediment-free class is easy to execute, and/or is executable in a very few operation steps. On the other hand, the gadget in the travel impediment class is considered as a gadget that is likely to impede the driving of the vehicle due to the complexity of its execution operation, that is, the gadget is hard to execute, and/or is executable only through many operation steps. Therefore, the gadget memory 3 stores gadget, types and travel impediment levels as travel impediment information for each of the respective gadgets. The gadgets in the travel impediment-free class may be memorized as level 1 gadgets, and the gadgets in the travel impediment class may be memorized as level 2 gadgets.

The above-described in-vehicle apparatus 1 is turned on to be in a power-on condition when an accessory (ACC) switch is switched on, and is turned off to be in a power-off condition when the ACC switch is switched off. Further, the in-vehicle apparatus 1 may have other functions such as a map display function, a current vehicle position detection function, a vehicle position display function, a destination setting function, a route search function or the like.

The operation scheme of the in-vehicle apparatus 1 is described with reference to FIGS. 2 to 6.

The control unit 2 determines whether the user performed a customization operation based on the operation detection signal input from the operation receptionist unit 5 in step S1 when, for example, the apparatus 1 is in the power-on condition by the turning on of the ACC switch. Then, the control unit 2 determines whether the speed of the vehicle is equal to or greater than a first speed threshold (e.g., 10 km/h) in step 2 based on the speed signal input from the vehicle speed sensor into the in-vehicle LAN interface unit 8 through the in-vehicle LAN. The first speed threshold may be a user-determined value, or may be a manufacture-determined value set in a manufacturing process.

When the control unit 2 determines that the user has performed the customization operation (step S1, YES), the control unit 2 customizes icon appearance of the gadget associated icon according to the customization operation in step S3, and the process returns to steps S1 and S2.

On the other hand, when the control unit 2 determines that the vehicle is traveling at a speed that is equal to or greater than the first threshold (step S2, YES), the control unit 2 changes the icon appearance of the gadget-associated icon to a predetermined appearance in step S4. Then, based on the vehicle speed signal input into the in-vehicle LAN interface unit 8 through the in-vehicle LAN from the vehicle speed sensor, the control unit 2 determines whether the vehicle speed falls down to be a speed that is equal to or smaller than a second speed threshold (e.g., 3 km/h) that is smaller than the first speed threshold in step S5. The second speed threshold may also be a user-determined value, or may be a manufacture-determined value set in a manufacturing process.

When the control unit 2 determines that the vehicle speed falls down to be smaller than the second speed threshold (step S5, YES), the control unit 2 returns the icon appearance of the gadget-associated icon back to a pre-change (i.e., original) icon appearance in step S6, to return the process to steps S1 and S2 mentioned above. That is, the control unit 2 changes the icon appearance at the above-mentioned two timings of vehicle speed change over the first/second speed thresholds.

The change of the icon appearance of the gadget-associated icons by the above-described process under control of the control unit 2 is described in the following. The maximum number of icons that can simultaneously be displayed in one screen is assumed to be '6' in the following example. The following example describes two cases, that is:

(1) The icons corresponding to all customizable gadgets are displayed in one screen, and (2) The icons corresponding to all customizable gadgets are displayed in multiple screens.

(1) Icons of all Customizable Gadgets Displayed in One Screen

Figures 2, 3:
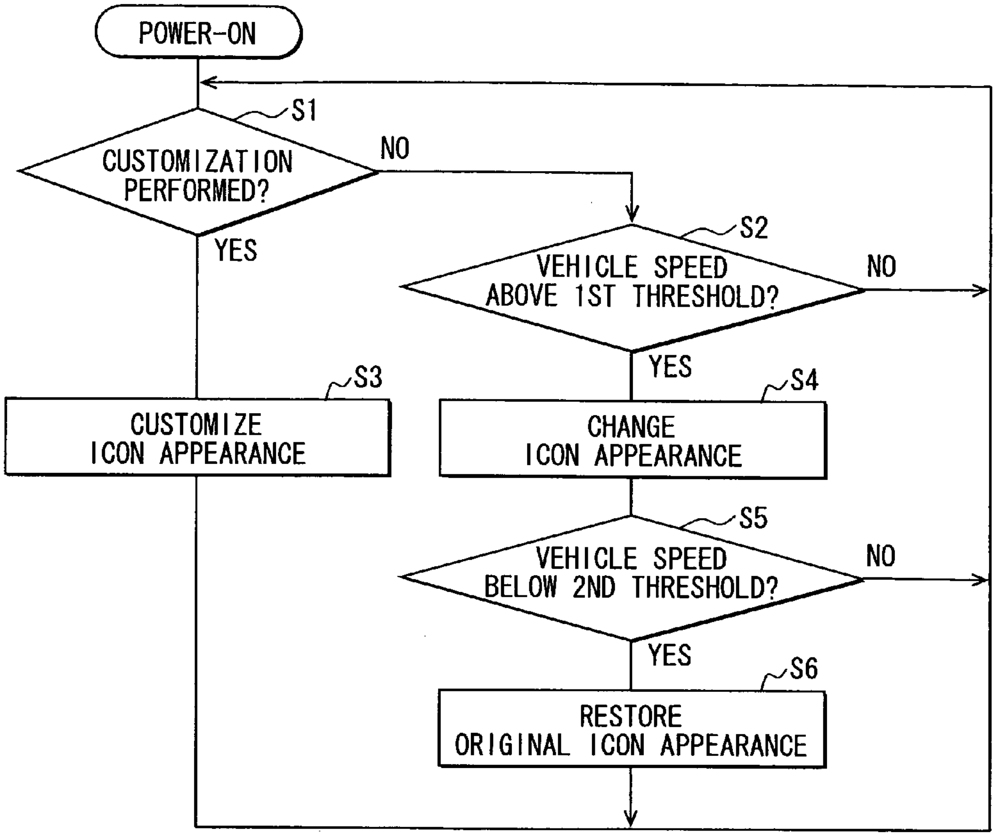
FIG. 2 is a flowchart of an icon display process in the embodiment.
FIG. 3 is a table diagram of a relationship between a gadget type and a regulation revel in the embodiment.
Figure 4A:
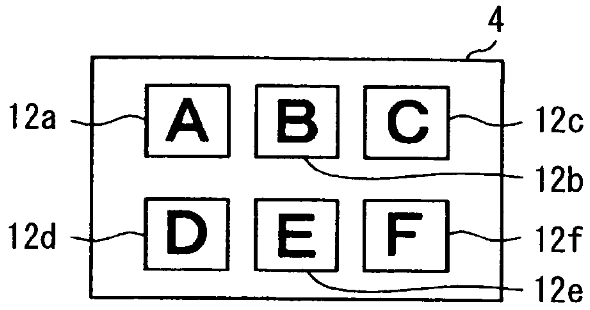
FIGS. 4A to 4E are illustrations of icons in different display forms in the embodiment.

The control unit 2 displays, as shown in FIG. 4A, all of the icons 12*a* to 12*f* corresponding to customizable gadgets in one screen in a normal condition that allows customization, when the gadgets stored in the gadget memory 3 are gadgets A to F as shown in FIG. 3, for example. In this case, it is assumed that the gadgets A, B, D, F belong to a travel impediment-free class, as level 1 gadgets, and the gadgets C, E belong to a travel impediment class, as level 2 gadgets.

Figure 4B:
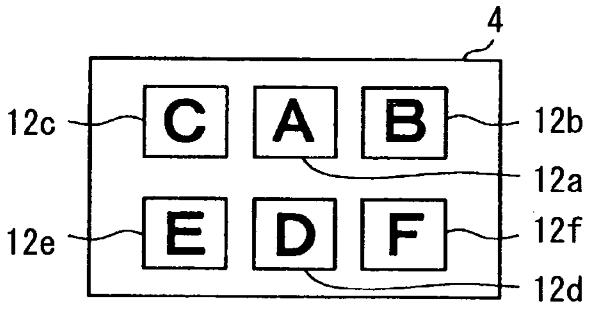

When, for example, the change of the icon appearance is registered as display position change, the icons 12*a*, 12*b*, 12*d*, 12*f* corresponding to the gadgets A, B, D, F in the travel impediment-free class are displayed by the control unit 2 on the right side of the screen, and the icons 12*c*, 12*e* corresponding to the gadgets C, E in the travel impediment class are displayed by the control unit 2 on the left side of the screen, as shown in FIG. 4B. That is, the control unit 2 displays the icons 12*a*, 12*b*, 12*d*, 12*f* corresponding to the gadgets A, B, D, F in the travel impediment-free class on the near side of the user (i.e., the driver), and displays the icons 12*c*, 12*e* corresponding to the gadgets C, E in the travel impediment class on the far side of the user, if the vehicle has a steering wheel on the right side of the body, for the left side traffic system in Japan, UK or the like.

Figure 4C:
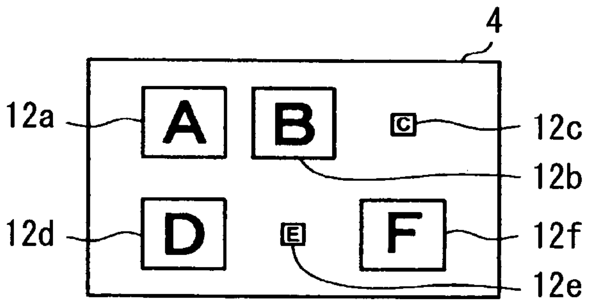

Further, when the change of the icon appearance is registered as display size change, the icons 12*a*, 12*b*, 12*d*, 12*f* corresponding to the gadgets A, B, D, F in the travel impediment-free class are displayed by the control unit 2, for example, in their original display size, and the icons 12*c*, 12*e* corresponding to the gadgets C, E in the travel impediment class are displayed by the control unit 2 in a smaller display size, as shown in FIG. 4C. Alternatively, the display size of the icons in the travel impediment-free class may be changed to be greater than the original display size, and the display size of the icons in the travel impediment class may be kept in the original display size.

Figure 4D:
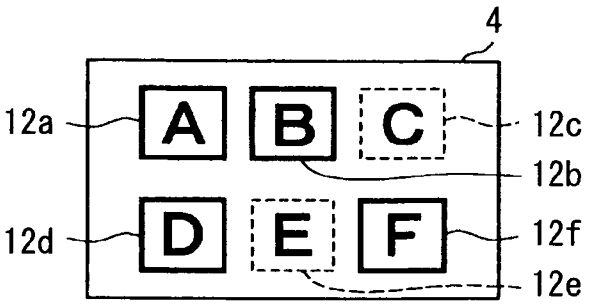

Further, when the change of the icon appearance is registered as display color change, the icons 12*a*, 12*b*, 12*d*, 12*f* corresponding to the gadgets A, B, D, F in the travel impediment-free class are displayed by the control unit 2, for example, in a vivid display color, and the icons 12*c*, 12*e* corresponding to the gadgets C, E in the travel impediment class are displayed by the control unit 2 in a dim display color, as shown in FIG. 4D. In this case, the "vivid" display color means that the icons have an increased degree of brightness, and/or that the icons stand out against the background. The vivid display color for the icons may mean an advancing color, which makes the icons look like advancing or protruding from the background plane, and/or an expansive color, which makes the icons look like expanding or swelling to a size that is greater than they actually are, and the "dim" display color means that the icons have a decreased degree of brightness, and/or that the icons look like buried in the background. The dim display color for the icons may mean a retreating color, which makes the icons look like retreating into the background plane, and/or a contracting color, which makes the icons look like contracting to a size that is smaller than they actually are. In FIG. 4D, the vividness is represented by a bold outline (i.e., a heavy line frame) of the icons, and the dimness is represented by a broken outline of the icons.

Figure 4E:
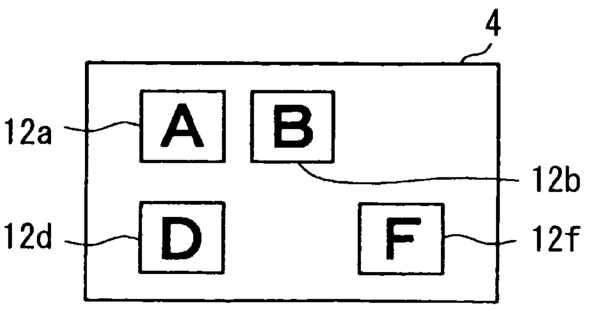

Furthermore, when the change of the icon appearance is registered as whether or not to display the icon itself on the screen, for example, the icons 12*a*, 12*b*, 12*d*, 12*f* corresponding to the gadgets A, B, D, F in the travel impediment-free class are displayed by the control unit 2 on the screen as they are, and the icons 12*c*, 12*e* corresponding to the gadgets C, E in the travel impediment class are erased from the screen by the control unit 2 as shown in FIG. 4E.

In other words, in case that the icons 12*a* to 12*f* corresponding to the customizable gadgets A to F are displayed in one screen, appearance of the icons 12*a*, 12*b*, 12*d*, 12*f* corresponding to the gadgets A, B, D, F in the travel impediment-free class is changed for easy recognition by the user, and appearance of the icons 12*c*, 12*e* corresponding to the gadgets C, E in the travel impediment class is changed for obscured/clouded recognition by the user, for all types of icon appearance change described above. Further, two or more change types of the icon appearance may be combined. That is, for example, change of the icon display position and change of the icon display size may be simultaneously performed.

The background color of the icons in the screen may also be changed. That is, for example, the background color may be gradually changed from the near side to the far side relative to the driver. The background color may be gradually changed from a dim color to a bright color. In this manner, the icons on the near side of the driver may have an increased contrast against the background color for the ease of the icon operation.

(2) Icons of all Customizable Gadgets Displayed in Multiple Screens

Figure 6A:
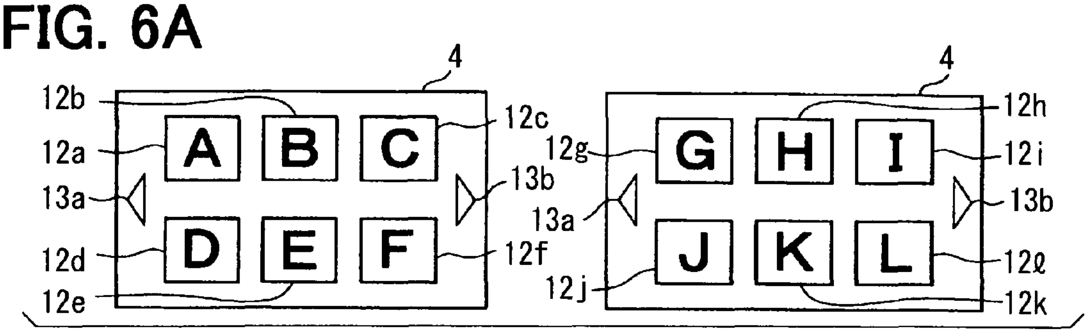
FIGS. 6A to 6E are illustrations of icons in different display forms in the modified embodiment.

When, for example, there are twelve gadgets A to L memorized in the gadget memory 3 as shown in FIG. 5, the icons 12*a* to 12*l* corresponding to the gadgets A to L are displayed in two pieces of screen, as shown in FIG. 6A. That is, the icons 12*a* to 12*l* extend to two screens. Now, it is assumed that the gadgets A, B, D, F, H, I, K, L belong to the travel impediment-free class, as level 1 gadgets, and the gadgets C, E, G, J belong to the travel impediment class, as level 2 gadgets. In this case, the control unit 2 is configured to display, as a first priority screen that is displayed at the time of power-on, a screen that includes the icons 12*a* to 12*f* corresponding to the gadgets A to F, and the control unit 2 is configured to display, as a second priority screen, a screen that includes the icons 12*g* to 12*l* corresponding to the gadgets G to L. Further, the control unit 2 is configured to switch between the first priority screen and the second priority screen when a previous screen key 13*a* or a next screen key 13*b* is operated.

Figure 6B:
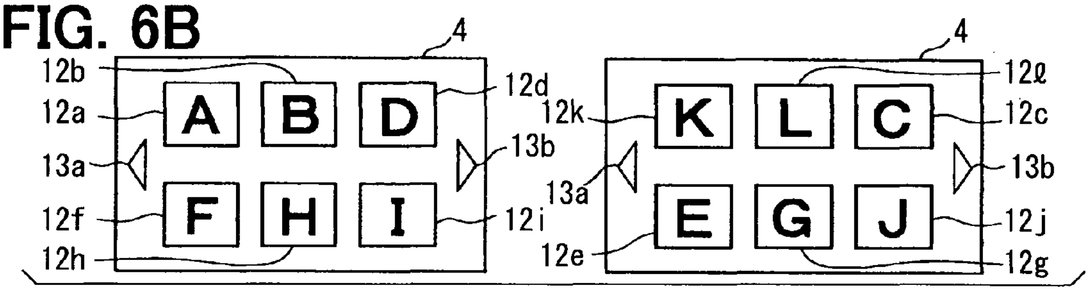

In this case, when the change of the icon appearance is registered as display position change, the control unit 2 re-arranges, for example, the icons 12*a*, 12*b*, 12*d*, 12*f*, 12*h*, 12*i* corresponding to the gadgets A, B, D, F, H, I in the travel impediment-free class to appear in the first priority screen, and re-arranges the icons 12*k*, 12*l* corresponding to the gadgets K, L in the travel impediment-free class and the icons 12*c*, 12*e*, 12*g*, 12*j* corresponding to the gadgets C, E, G, J in the travel impediment class to appear in the second priority screen, as shown in FIG. 6B.

Figure 6C:
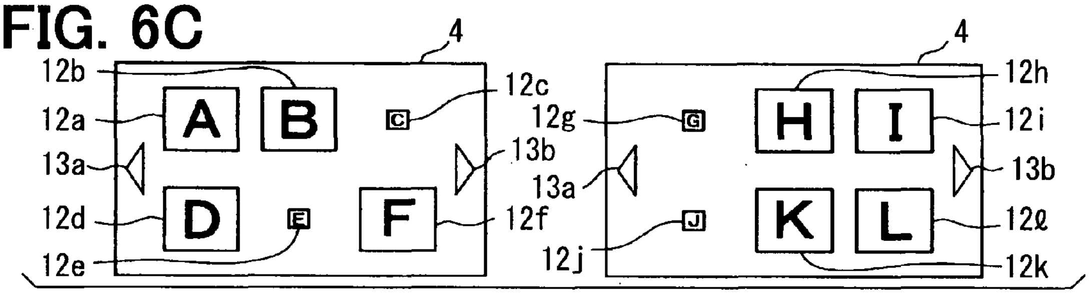

Further, when the change of the icon appearance is registered as display size change, the control unit 2 displays, for example, the icons 12*a*, 12*b*, 12*d*, 12*f*, 12*h*, 12*i*, 12*k*, 12*l* corresponding to the gadgets A, B, D, F, H, I, K, L in the travel impediment-free class in an original display size on the screen, and displays the icons 12*c*, 12*e*, 12*g*, 12*j* corresponding to the gadgets C, E, G, J in the travel impediment class in a reduced display size on the screen, as shown in FIG. 6C. Alternatively, the display size of the icons in the travel impediment-free class may be increased from the original display size, and the display size of the icons in the travel impediment class may be kept in the original display size.

Figure 6D:
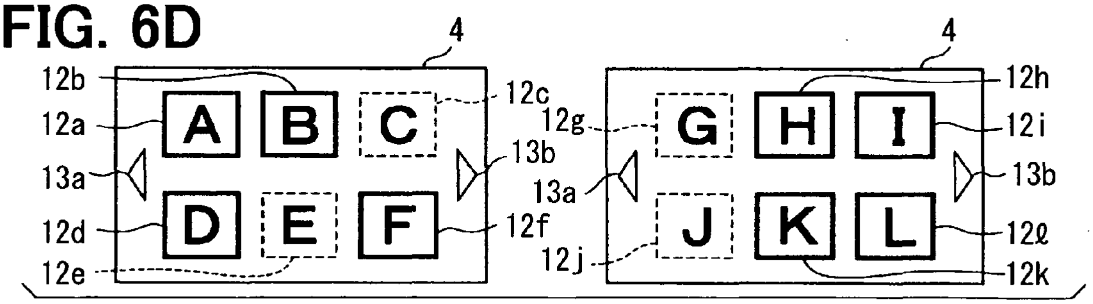

Further, when the change of the icon appearance is registered as display color change, the control unit 2 displays, for example, the icons 12*a*, 12*b*, 12*d*, 12*f*, 12*h*, 12*i*, 12*k*, 12*l* corresponding to the gadgets A, B, D, F, H, I, K, L in the travel impediment-free class in a vivid display color on the screen, and displays the icons 12*c*, 12*e*, 12*g*, 12*j* corresponding to the gadgets C, E, G, J in the travel impediment class in a dim display color on the screen, as shown in FIG. 6D.

Figure 6E:
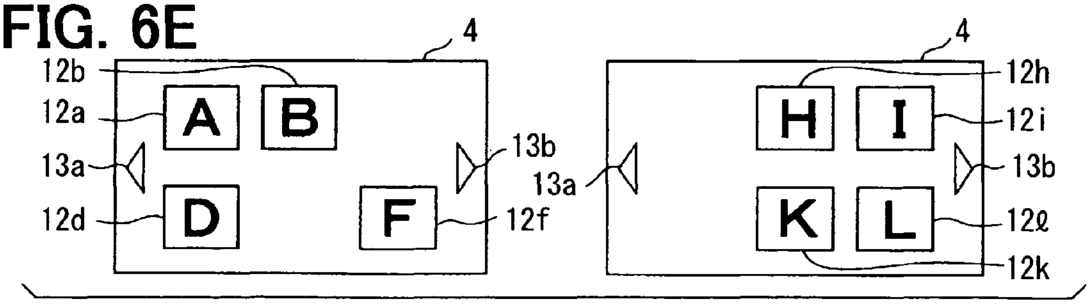

Further, when the change of the icon appearance is registered as whether or not to display the icon on the screen, the control unit 2 displays, for example, the icons 12*a*, 12*b*, 12*d*, 12*f*, 12*h*, 12*i*, 12*k*, 12*l* corresponding to the gadgets A, B, D, F, H, I, K, L in the travel impediment-free class on the screen as they are, and the control unit 2 erases the icons 12*c*, 12*e*, 12*g*, 12*j* corresponding to the gadgets C, E, G, J in the travel impediment class from the screen, as shown in FIG. 6E.

In other words, in case that the icons 12*a* to 12*l* corresponding to the customizable gadgets A to L are displayed in multiple screens, appearance of the icons 12*a*, 12*b*, 12*d*, 12*f*, 12*h*, 12*i*, 12*k*, 12*l* corresponding to the gadgets A, B, D, F, H, I, K, L in the travel impediment-free class is changed for easy recognition by the user, and appearance of the icons 12*c*, 12*e*, 12*g*, 12*j* corresponding to the gadgets C, E, G, J in the travel impediment class is changed for obscured/clouded recognition by the user, for all types of the icon appearance change described above. Further, two or more changes of the icon appearance may be combined.

The background of the respective screens, i.e., the first priority screen and the second priority screen, may have different colors. That is, the first priority screen may have a brighter background color than the second priority screen, for the ease of the icon operation. Respectively different background colors of the two screens may improve a sense of "where-am-I" of the user, that is, a sense of which of the two screens the user is currently looking at.

In the present embodiment, the in-vehicle apparatus 1 changes the icon appearance of the gadget-associated icon based on the travel impediment information associated with the target gadget. The change of the icon appearance makes the icons in the travel impediment-free class easy to recognize for the user, and makes the icons in the travel impediment class obscured/clouded to recognize for the user, as described above. Therefore, the icons displayed on the screen of the traveling vehicle can be easily distinguished by the user either as a "non-impeding" icon or an "impeding" icon, in terms of ease of user recognition and operation during the travel of the vehicle.

Although the present disclosure has been fully described in connection with preferred embodiment thereof with reference to the accompanying drawings, it is to be noted that various changes and modifications will become apparent to those skilled in the art.

For example, travel impediment information may have three or more impediment levels instead of only two impediment levels, and the icon appearance in each of those levels may be changed accordingly. That is, the icon display size may be changed according to the three impediment levels, to have the display size in three levels of large, medium and small.

Further, the travel of the vehicle may be detected and determined based on various signals from sensors and devices. That is, signals such as a shift position signal indicative of a shift position (i.e., a parking position, a drive position, a neutral position and the like), an accelerator opening signal indicative of the opening degree of the accelerator, a brake operation signal indicative of the operation of a brake or similar signals may be configured to be input to the in-vehicle LAN interface unit 8, in addition to the speed signal from the vehicle speed sensor, and those signals may be utilized to determine whether the vehicle is currently traveling or not.

Furthermore, the travel of the vehicle may be detected and determined based on some of those signals, or based on all of those signals (i.e., the speed signal, the shift position signal, the accelerator opening signal, the brake operation signal and the like). Determination of the travel of the vehicle by utilizing some or all of those signals has increased reliability even when one or more of those signals are false or camouflaged. More practically, even when the shift position signal is not input, or even when the shift position signal always indicates that the shift lever is in the parking position, which is suspected to be a camouflage, the other signals such as the speed signal, the accelerator opening signal, the brake operation signal and the like are utilized for the reliable determination of the travel of the vehicle, thereby improving the safety of the user in the vehicle.

Furthermore, a GPS receiver for receiving GPS signals from GPS satellites, a lateral acceleration sensor for detecting acceleration of the vehicle in a vehicle width direction, and a longitudinal acceleration sensor for detecting acceleration of the vehicle in a front-rear direction may also be installed in the vehicle and signals from those devices and sensors may be utilized for determining position change of the vehicle and for determining whether the vehicle is traveling or not.

The change of the icon appearance may look like "morphing" of the icon image. That is, the icon appearance may be changed in a "flipping" manner, or the icon appearance may be changed in a "take-time" manner. When the icon appearance is changed more slowly and gradually, the change of the icon appearance is more clearly recognized by the user, in the course of morphing. In other words, the travel impediment to be caused by the operation of the morphed icons may be intuitively recognized by the user in the course of morphing of the "impeding" icons.

Such changes, modifications, and summarized schemes are to be understood as being within the scope of the present disclosure as defined by appended claims.

What is claimed is:

1. An in-vehicle apparatus comprising:

a memory unit for memorizing a gadget that is associated with information on a travel impediment of a vehicle;

a display unit for displaying a gadget-associated icon that is associated with the gadget in the memory unit;

an operation reception unit for receiving an operation of the icon that is being displayed on a screen of the display unit;

a control unit for controlling execution of a gadget-associated process that is associated with the gadget when the control unit determines that the gadget-associated icon displayed on the screen of the display unit has received the operation through the operation reception unit; and a travel condition acquisition unit for acquiring a travel condition of the vehicle which has the in-vehicle apparatus disposed thereon, wherein the control unit changes icon appearance according to (a) the information on the travel impediment associated with the gadget, and (b) the travel condition of the vehicle acquired by the travel condition acquisition unit, the control unit controls the display unit to display a plurality of gadget-associated icons on a plurality of screens of the display unit in a normal condition that allows icon customization and the change of the icon appearance extends to the plurality of screens, the control unit determines which of the gadget-associated icons correspond to the gadget indicated as impediment-free-class and which of the gadget-associated icons correspond to the gadget indicated as impediment-class in the information on the travel impediment, and the control unit re-arranges the plurality of gadget-associated icons, such that:

icons corresponding to the gadget indicated as the impediment-free-class in the information on the travel impediment and that fit on a first priority screen are arranged in the first priority screen of the plurality of screens, icons corresponding to the gadget indicated as the impediment-free-class in the information the travel impediment and that do not fit on a first priority screen are arranged in a second priority screen of the plurality of screens, and icons corresponding to the gadget indicated as the impediment-class in the information on the travel impediment are arranged in the second priority screen of the plurality of screens separately from the icons indicated as the impediment-free-class that are on the second priority screen, wherein the icons corresponding to the gadgets indicated as the impediment-free-class and the icons corresponding to the gadgets indicated as the impediment-class can receive an operation of the icon even after being re-arranged into the first and second priority screens.

2. The in-vehicle apparatus of claim 1, wherein the travel condition acquisition unit acquires, as the travel condition of the vehicle, a travel speed of the vehicle, and the travel speed of the vehicle is utilized as the travel condition of the vehicle.

3. The in-vehicle apparatus of claim 1, wherein when the plurality of gadget-associated icons are displayed on a single screen by the control unit in a normal condition that allows icon customization, the change of the icon appearance is kept within the single screen, the icons are in the normal condition after being re-arranged, and the impediment-free-class icons and the impediment-class icons within the first and second priority screens are within the single screen.

4. The in-vehicle apparatus of claim 1, wherein the change of the icon appearance by the control unit is regarding an icon display position on the screen.

5. The in-vehicle apparatus of claim 1, wherein the change of the icon, appearance by the control unit is regarding an icon display size on the screen.

6. The in-vehicle apparatus of claim 1, wherein the change of the icon appearance by the control unit is regarding an icon display color on the screen.

7. The in-vehicle apparatus of claim 1, wherein the change of the icon appearance by the control unit is regarding whether the gadget-associated icon is allowed to appear on the screen.

8. The in-vehicle apparatus of claim 2, wherein (a) the control unit changes the icon appearance when the travel speed of the vehicle is equal to or greater than a first threshold, and (b) the control unit restores a pre-change icon appearance when the travel speed of the vehicle once exceeding the first threshold falls down to be equal to or smaller than a second threshold that is smaller than the first threshold.

9. A method of controlling an in-vehicle apparatus in a vehicle comprising:

memorizing a gadget that is associated with information on a travel impediment of the vehicle;

displaying on a screen of a display unit a gadget-associated icon that is associated with the memorized gadget;

receiving an operation of the icon that is being displayed on the screen of the display unit;

controlling execution of a gadget-associated process that is associated with the gadget when it is determined that the gadget-associated icon displayed on the screen has received the operation;

acquiring a travel condition of the vehicle that has the in-vehicle apparatus disposed thereon;

controlling the display unit to display a plurality of gadget-associated icons on a plurality of screens of the display unit in a normal condition that allows icon customization and the change of the icon appearance extends to the plurality of screens;

determining which of the gadget-associated icons correspond to the gadget indicated as impediment-free-class and which of the gadget-associated icons correspond to the gadget indicated as impediment-class in the information on the travel impediment; and re-arranging the plurality of gadget-associated icons, such that:

icons corresponding to the gadget indicated as the impediment-free-class in the information on the travel impediment and that fit on a first priority screen are arranged in the first priority screen of the plurality of screens, icons corresponding to the gadget indicated as the impediment-free-class in the information on the travel impediment and that do not fit on the first priority screen are arranged in a second priority screen of the plurality of screens, and icons corresponding to the gadget indicated as the impediment-class in the information on the travel impediment are arranged in the second priority screen of the plurality of screens separately from the icons indicated as the impediment-free-class that are the second priority screen, wherein icon appearance is changed according to (a) the information on the travel impediment associated with the gadget, and (b) the acquired travel condition of the vehicle, and the icons corresponding to the gadgets indicated as the impediment-free-class and the icons corresponding to the gadgets indicated as the impediment-class can receive an operation of the icon even after being re-arranged into the first and second priority screens.

10. A method of controlling an in-vehicle apparatus in a vehicle, the apparatus having functional gadgets, each of the gadgets represented by an icon displayed on a screen of a display unit, the method comprising:

determining that an icon display condition is in a normal condition;

determining whether vehicle speed is over a first threshold;

morphing icon appearance on a screen of a display unit by a preset rule according to travel impediment information of the respective gadgets when the vehicle speed is over the first threshold;

restoring original icon appearance on the screen when the vehicle speed falls down below a second threshold that is smaller than the first threshold;

returning to the determination of the icon display condition;

controlling the display unit to display a plurality of gadget-associated icons on a plurality of screens of the display unit in a normal condition that allows icon customization and the change of the icon appearance extends to the plurality of screens;

determining which of the gadget-associated icons correspond to the gadget indicated as impediment-free-class and which of the gadget-associated icons correspond to the gadget indicated as impediment-class in the information on the travel impediment; and re-arranging the plurality of gadget-associated icons, such that:

icons corresponding to the gadget indicated as the impediment-free-class in the information on the travel impediment and that fit on a first priority screen are arranged in the first priority screen of the plurality of screens, icons corresponding to the gadget indicated as the impediment-free-class in the information on the travel impediment that do not fit on the first priority screen are arranged in a second priority screen of the plurality of screens, and icons corresponding to the gadget indicated as the impediment-class in the information on the travel impediment are arranged in the second priority screen of the plurality of screens separately from the icons indicated as the impediment-free-class that are on the second priori, screen, wherein the gadgets are classified into at least two impediment levels, including the impediment-free -class and the impediment-class, according to the travel impediment information associated therewith, and the icons corresponding to the gadgets indicated as the impediment-free-class and the icons corresponding to the gadgets indicated as the impediment-class can receive an operation of the icon even after being re-arranged into the first and second priority screens.

11. The method of claim 10, wherein the preset rule of morphing changes a position of the icon.

12. The method of claim 10, wherein the preset rule of morphing changes a size of the icon.

13. The method of claim 10, wherein the preset rule of morphing changes a color of the icon.

14. The method of claim 10, wherein the preset rule of morphing erases the icon from the screen.

15. The method of claim 10, wherein the preset rule of morphing changes a background color of the screen.

16. The method of claim 15, wherein the background color of the screen is changed according to closeness to the user.

17. The method of claim 10, wherein the preset rule of morphing extends to a plurality of screens when the plurality of screens are required for icon display.

18. The method of claim 17, wherein the plurality of screens have respectively different colors.

19. The method of claim 10, wherein the morphing of the icon appearance takes a predetermined period of time.

* * * * *